April 8, 1958 J. W. TILEY 2,830,251

FREQUENCY CHANGER

Filed March 19, 1952 2 Sheets-Sheet 1

INVENTOR.
JOHN W. TILEY
BY
Brown, Denk & Synnestvedt
AGENTS

INVENTOR.
JOHN W. TILEY
BY
Brown, Denk & Synnestvedt
AGENTS

United States Patent Office 2,830,251

Patented Apr. 8, 1958

2,830,251

FREQUENCY CHANGER

John W. Tiley, Hatboro, Pa., assignor to Philco Corporation, Philadelphia, Pa., a corporation of Pennsylvania Application March 19, 1952, Serial No. 277,432

15 Claims. (Cl. 321—69)

The present invention relates to frequency changing systems and more particularly to systems for providing an output signal at a multiple or submultiple of the frequency of an applied sinusoidal signal.

Frequency dividing and frequency multiplying circuits employing vacuum tubes have been known for some time and are now in current use. While such vacuum tube circuits are considered to be generally satisfactory as far as performance is concerned, they are subject to the disadvantage that they are complex in nature and, for this reason, costly to manufacture. Furthermore, a vacuum tube is a relatively fragile device and special care must be taken if circuits containing such tubes are to be subjected to vibrations and shocks. Vacuum tube circuits also require external sources of biasing potentials and filament current which add to the complexity and attendant cost of manufacture of the circuit.

In recent years considerable attention has been given to the development and improvement of nonlinear, saturable dielectric materials, for example barium titanate, strontium titanate and mixtures of barium and strontium titanates. Capacitors formed of such a saturable dielectric material have capacitances that may vary widely depending upon the density of the electric field within the dielectric. Since these saturable dielectric materials exhibit many properties that are similar to saturable magnetic materials, they are sometimes referred to as ferroelectrics or as ferroelectric materials.

Prior to the time of the present invention, power amplifier circuits and mixer circuits employing nonlinear capacitors and a considerably fewer number and, in some cases, no vacuum tubes have been designed and successfully tested. Frequency doubler circuits employing nonlinear capacitors have also been successfully constructed. However, circuits of this type for obtaining a frequency multiplication factor greater than two were unknown heretofore. Circuits employing nonlinear capacitors to obtain submultiples of an applied sinusoidal signal were also unknown prior to the date of the present invention.

Therefore, it is an object of the present invention to provide a relatively simple circuit for the division or multiplication of the frequency of an applied signal.

It is a further object of the present invention to provide a novel circuit for the division or multiplication of the frequency of an applied signal which avoids the use of vacuum tubes.

Still another object of the present invention is to provide a novel circuit that makes use of the nonlinear properties of ferroelectric materials for obtaining an output signal at a frequency which is a submultiple of the frequency of an applied signal.

A further object of the present invention is to provide a novel circuit for obtaining a signal at a submultiple frequency which is related in phase to the phase of the applied signal.

Still another object of the present invention is to provide a novel circuit for obtaining a signal at a frequency which is a submultiple of the frequency of one applied signal which is related in phase to the phases of two applied signals.

These and other objects of the present invention, which will appear as the description of the invention proceeds, are generally accomplished by applying the input signal or signals to a multiterminal, bridge type circuit employing a nonlinear dielectric or ferroelectric material. Also coupled to the bridge type circuit is at least one inductor which resonates with certain capacitances presented by the bridge circuit at a multiple or submultiple of the applied signal. Input signal energy is supplied through the bridge circuit to the inductor. The output signal is derived from the inductor.

For a better understanding of the present invention reference should now be made to the following detailed description which refers to the accompanying drawings in which.

Figure 1:
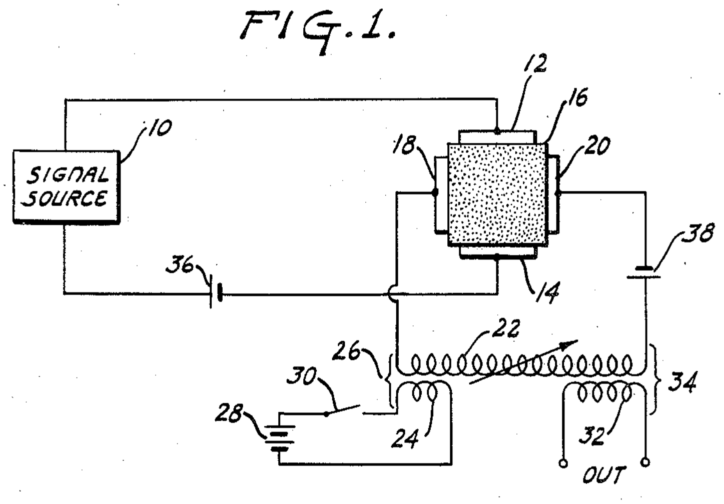
Fig. 1 is a schematic diagram of one preferred form of the invention.

In Fig. 1, block 10 represents a signal source which has as its output a substantially sinusoidal signal at the frequency to be divided. Source 10 may be a primary source of signals, for example an oscillator, or it may be a secondary source of signals, for example a mixer or another frequency changing circuit.

Source 10 is coupled to conductive plates 12 and 14 which are disposed on opposite faces of a block of ferroelectric material 16. Barium titanate and strontium titanate are two examples of ferroelectric materials suitable for use in the present invention. Block 16 is preferably in the shape of a rectangular prism with a substantially square cross-section as shown in Fig. 1. However, the shape of block 16 may depart from this preferred shape to a considerable extent without adversely affecting the operation of the invention. Conductive plates 18 and 20 are placed on faces of block 16 that are at right angles to plates 12 and 14. Plates 12, 14, 18 and 20 and block 16 together form a four terminal capacitive bridge. Block 16 may have an edge length of the order of one millimeter for an operating frequency measured in hundreds of megacycles. For lower frequencies and for operation at higher power levels the edge length may be increased to a centimeter or more. The close physical spacing at the higher frequencies may be obtained by forming a large block of the dielectric with openings in the appropriate faces to receive recessed electrodes. The physical spacing between the recessed electrodes may be made small enough to give the desired frequency response while the edge length of the block may be made large enough to permit convenient handling and mounting of the unit.

A tunable inductor 22 is connected at its terminals to plates 18 and 20 respectively. A coil 24, which is magnetically linked to inductor 22, is provided as a means for inducing momentary oscillations in inductor 22. The magnetic linkage between coil 24 and inductor 22 is represented in Fig. 1 by bracket 26. A battery 28 and a normally open, momentary contact switch 30 are provided for shock exciting coil 24. Coil 24, battery 28 and switch 30 are included in Fig. 1 for the sole purpose of illustrating one of the many known methods of inducing oscillations in inductor 22 and the invention is not to be limited in any manner by the inclusion of this specific example. An output winding 32, also magnetically coupled to inductor 22 as illustrated by bracket 34, is provided as a means for deriving an oscillatory signal from inductor 22.

Bias batteries 36 and 38 are connected in the leads to plates 14 and 20, respectively, to establish a selected concentration of electric field in block 16 in the absence of an oscillatory signal in either the input circuit or the output circuit. As will be explained in greater detail below, coil 24 and bias batteries 36 and 38 may not be required in certain embodiments of the present invention. However, since it is advantageous or necessary to include these elements in certain embodiments of the invention, they have been shown in Fig. 1.

In the system shown in Fig. 1, the arrangement of plate pairs 12—14 and 18—20 is such that the electric fields existing between these two plate pairs are mutually perpendicular. Therefore if the system of Fig. 1 were composed entirely of linear elements, no direct coupling of energy would take place between plate pairs 12—14 and 18—20. Furthermore, the symmetrical arrangement of the four pairs of adjacent plates, that is pairs 12—18, 18—14, 14—20 and 20—12 would prevent coupling of energy from signal source 10 to inductor 22 in a linear system. Another way of stating this last proposition is to say that the four pairs of adjacent plates form a balanced four-terminal bridge type circuit. It is well known that there is no coupling between opposite terminals of a balanced bridge in a linear system.

It has been found, however, that if the dielectric constant of the block 16 is nonlinear, and if inductor 22 is tuned so that the parallel circuit formed by inductor 22 and the dielectric block 16 and associated plates 18 and 20 is resonant at a multiple or submultiple of the frequency of signal source 10, sustained oscillations at the multiple or submultiple frequency will occur in inductor 22. Since the only source of energy in a system which does not include bias sources 36 and 38 is source 10, it must be assumed that energy is transferred from source 10 to inductor 22 through block 16. This transfer of energy does not depend on the existence of the multiple or submultiple frequencies in the signal from source 10 since the transfer of energy is known to occur even for pure sinusoidal variations in potential at the output of source 10.

The theory of operation of the circuit of Fig. 1 is not fully understood but it can be shown mathematically that harmonic or subharmonic frequencies do exist in systems having one or more nonlinear circuit parameters. In the system of Fig. 1, block 16 is such a nonlinear circuit parameter. The existence of subharmonic response in mechanical and magnetic systems has been demonstrated experimentally. A discussion of the phenomenon in mechanical and electrical systems is to be found in "Nonlinear Vibrations in Mechanical and Electrical Systems," J. J. Stokes, Interscience Publishers, Inc., New York, 1950. A discussion of subharmonic response in nonlinear systems is to be found on page 103 of this reference.

Figure 3:
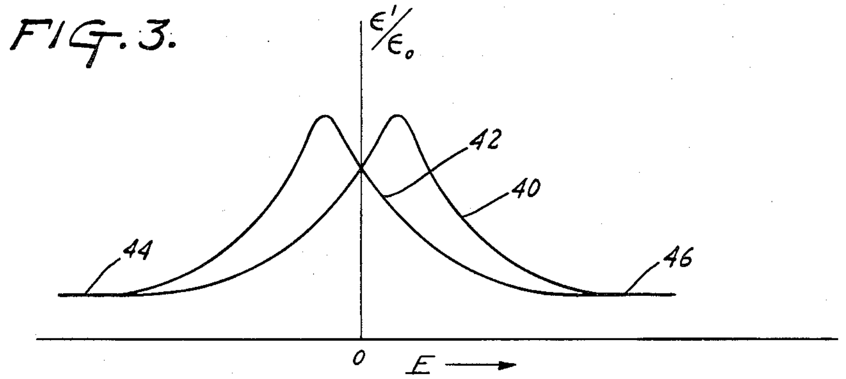
Fig. 3 is a plot illustrating the dielectric constant versus applied voltage characteristic of the ferroelectric material which forms a part of the present invention.

It is believed that the transfer of energy may take place due to residual polarization, or hysteresis, in the dielectric and/or partial or total electric field saturation of the dielectric material. The saturation and hysteresis effects in a typical ferroelectric material, for example barium titanate is shown in Fig. 3. In Fig. 3 the dielectric constant $\epsilon'/\epsilon_0$ is plotted as the ordinate against the polarizing potential E as abscissa. Curve 40 represents the change in dielectric constant as the polarizing potential changes from a negative to a positive value while curve 42 represents the change in dielectric constant for a change in polarizing potential in the opposite direction. The minimum or saturated value of the dielectric constant is shown at 44 and 46 in Fig. 3.

Although the theory of operation of the system of Fig. 1 is not fully understood it is known with reasonable certainty that certain harmonics and subharmonics are self-initiating if inductor 22 is tuned to the proper frequency while certain other subharmonics will exist only if oscillations at the particular subharmonic frequency are excited in inductor 22 by some auxiliary means, for example by closing switch 30.

It is also known that the phase of the subharmonic bears a direct relationship to the phase of the applied. This is to be expected since the subharmonic is not a free oscillation but is actually a forced oscillation of the output circuit, resulting from the application of the signal from source 10 to the system. The term "phase" as used herein is to be understood as referring to the relative time positions of identifiable conditions in signals of different frequencies, for example the relative time positions of a zero voltage condition in the subharmonic signal and the zero voltage condition of the applied signal occurring closest thereto in time.

It can also be indicated mathematically that, for lower order subharmonics at least and for a given change in dielectric constant, the ratio of applied sinusoidal potential to the damping factor of the system must exceed a certain minimum value before the subharmonic will exist as a sustained oscillation. In the system of Fig. 1, the energy derived from the system by coil 32 must be considered as part of the losses or damping in the system.

The optimum operating point on the characteristic curve of the dielectric for the particular subharmonic to be generated may be selected by varying the bias potentials provided by bias sources 36 and 38. The appropriate values of bias potentials will generally be between zero and the potential required to bring about saturation in the dielectric block 16.

The amount of energy that may be derived from output winding 32 without interrupting the oscillations in inductor 22 will depend to a certain extent on the ratio of the input frquency to the output frequency. Generally, more energy can be derived from inductor 22 for small ratios of division and multiplication than for larger ratios. However, suitable means for amplifying the energy output of winding 32 may be provided if necessary. The upper limit of energy transfer is generally set by the maximum permissible heating of block 16 due to losses in the dielectric.

While certain of the parameters of the system of Fig. 1 must be determined empirically for the particular frequency of source 10 and the harmonic or subharmonic to be generated, it it believed that the ranges of values that these parameters may assume are sufficiently broad so that the system of Fig. 1 may be constructed and operated with a minimum of experimentation by the average skilled technician.

Figure 2:
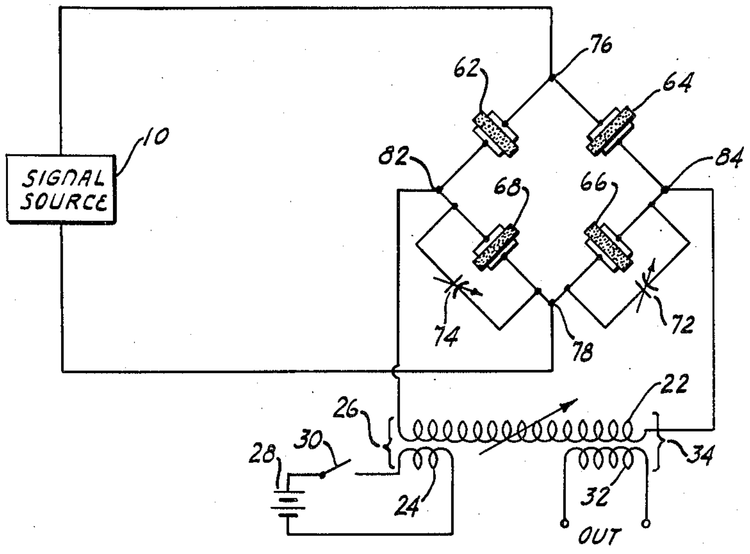
Fig. 2 is a schematic diagram of a second preferred form of the present invention.

A second embodiment of the invention is illustrated in Fig. 2. In this embodiment, four nonlinear capacitors 62, 64, 66 and 68 are arranged in a four-terminal bridge circuit. Linear, variable capacitors 72 and 74, are coupled in shunt with nonlinear capacitors 66 and 68, respectively as means for balancing the bridge to prevent direct coupling of energy from terminals 76 and 78 to terminals 82 and 84. The maximum capacitance of capacitors 72 and 74 should be small compared to the unsaturated capacitance of capacitors 66 and 68 in order that the nonlinear characteristics of the bridge be not disturbed. Similar, small, linear capacitors may be coupled between adjacent plates in the embodiment of Fig. 1 to correct any unbalance in the bridge type circuit formed by block 16 and plates 12, 14, 18 and 20.

The remainder of the circuit of Fig. 2 is identical to the embodiment of Fig. 1 with the exception that bias batteries 36 and 38 have been omitted. Therefore, parts in Fig. 2 corresponding to like parts in Fig. 1 have been given the same reference numerals. It will be seen that the signals applied at terminals 76 and 78, and signals appearing across terminals 82 and 84, both contribute to saturation in the four nonlinear capacitors. Inductor 22 is tuned to resonate with the capacitance of the bridge as seen from terminals 82 and 84. It is believed that energy transfer takes place between signal source 10 and inductor 22 in a manner similar to that suggested above in connection with the discussion of Fig. 1.

Figure 4:
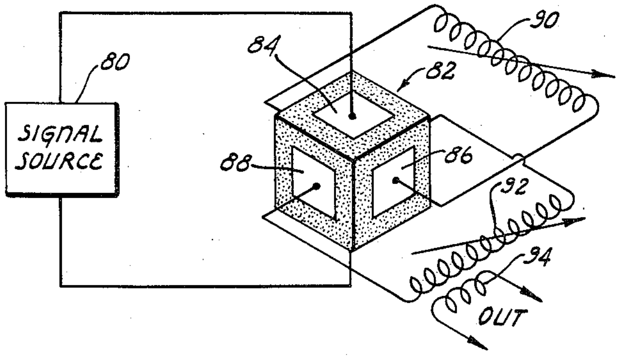
Fig. 4 is a schematic diagram of an embodiment of the invention arranged for multiple step frequency division.

Fig. 4 illustrates an embodiment of the invention arranged for multiple step frequency division of a signal from source 80. The system of Fig. 4 is similar to that shown in Fig. 1 with the addition of a third pair of plates on the faces of the block of ferroelectric material which were unoccupied in Fig. 1. Therefore, block 82 of Fig. 4 is provided with three pairs of plates, 84, 86 and 88, only one plate of each pair being visible in Fig. 4. Source 80 is coupled across plates 84 to supply energy to the system. Inductor 90, coupled across plates 86, is tuned to resonate with the capacitance between plates 86 at some submultiple of the frequency of the signal from source 80, for example one-third the frequency of this signal. A second inductor 92 is coupled across plates 88 and is tuned to resonate at a submultiple of the frequency of the tuned circuit including inductor 90. Again, inductor 92 may be tuned so that this second submultiple frequency is one-third the frequency of the first submultiple frequency. A winding 94, magnetically coupled to inductor 92, is provided as a means for deriving an output signal from the oscillatory system. Suitable means (not shown in Fig. 4) are also provided for shock exciting oscillations in inductors 90 and 92.

The operation of the system of Fig. 4 is very similar to the operation of the system of Fig. 1. Source 80 supplies a signal having at least an oscillatory component. In addition, it may supply a D.-C. component if a bias is required for the proper operation of the system. Energy is transferred from source 80 to inductor 90 owing to the nonlinear action of the dielectric block 82. This added energy sustains the oscillations originally set up in inductor 90 by shock excitation. If oscillations are present in inductor 90, this inductor may be considered to be a secondary source of energy which will transfer energy to inductor 92 if oscillations of the proper frequency exist in inductor 92. Obviously, any energy transferred to inductor 92 must originate in source 80 and, indeed, energy will be coupled from plates 84 to plates 88 due to the nonlinear properties of block 82. However, the inclusion of inductor 90 will serve to increase the energy transfer to inductor 92 and improve the stability of the circuit. In the example given above, the total frequency division from source 80 to inductor 92 is nine.

The system of Fig. 4 may also be made to operate for certain combinations of frequencies where inductors 90 and 92 are tuned to submultiples of the frequency of source 80 but where one submultiple is not a multiple of the other. Such a system may be considered to comprise two systems of the type shown in Fig. 1 superimposed on each other and having a common signal source.

Figure 5:
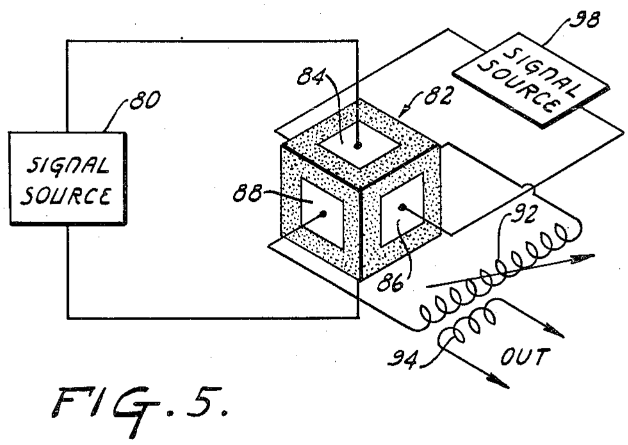
Fig. 5 is a schematic diagram of an embodiment of the invention providing an output signal related in phase to the phases of two input signals.

The system of Fig. 5 is very similar to that shown in Fig. 4 and, for this reason, parts in Fig. 5 corresponding to like parts in Fig. 4 have been given the same reference numerals. It was stated in connection with the description of Fig. 4 that inductor 90 could be considered as a secondary source of energy in the system. In the embodiment of Fig. 5, inductor 90 is replaced by an actual source 98 which may have an output that is higher or lower in frequency than the frequency of source 80. However, sources 80 and 98 should have at least one common submultiple frequency, this being the submultiple frequency to which inductor 92 is tuned. Again source 98 may or may not supply a D.-C. component of energy. The remainder of the system of Fig. 5 is identical to the system of Fig. 4.

The system of Fig. 5 may be considered as two systems of the type shown in Fig. 1 superimposed on one another. It was pointed out in connection with the description of Fig. 1 that the phase of the submultiple is directly related to the phase of the applied signal. Therefore it should be obvious that, in the system of Fig. 5, the phase of the output signal derived from winding 94 will be dependent upon the phases of the signals from both sources 80 and 98. If the phase of one signal, for example the phase of the signal from source 80, is taken as the reference phase, the phase of the output signal derived from winding 94 will be directly related to the phase of the signal from the other source, in this example source 98. This system may be advantageously employed in television systems to develop a signal related in phase to two or more synchronization signals present in the television system, as is required, for example, in certain color television systems. However, since the present invention is not primarily concerned with the specific uses which may be made of its many embodiments, it is deemed unnecessary to describe this application in detail.

While there have been described what are at present considered to be preferred embodiments of the present invention, it is to be understood that other embodiments and modifications falling within the spirit and scope of the appended claims are to be considered to be an integral part of the present invention and equal in importance to what is specifically shown.

I claim:

1. A frequency changing circuit comprising a four-terminal capacitive bridge formed of a rectangular prism of ferroelectric material and two pairs of conductive plates, the two plates of each of said pairs being disposed on two opposed faces of said prism, a source of substantially sinusoidal signal at a first frequency, said signal source being coupled to a first pair of opposite plates of said bridge for supplying energy thereto, an inductor coupled across the second pair of plates of said bridge, said inductor and said bridge, as seen from said second pair of plates, forming a circuit resonant at a second frequency, the ratio of the larger of said first and second frequencies to the smaller of said two frequencies being expressable as an integer, means coupled to said inductor for momentarily inducing oscillations in said resonant circuit, and means for deriving energy at said second frequency from said inductor.

2. A frequency divider circuit comprising a four-terminal capacitive bridge formed of a rectangular prism of ferroelectric material and first and second pairs of conductive plates, the two plates of each of said pairs being disposed on two opposed faces of said prism, a source of substantially sinusoidal signal at a first frequency, said signal source being coupled to said first pair of opposite plates of said bridge for supplying energy thereto, a tunable inductor coupled across the second pair of said plates, said inductor being tuned to resonate with the capacitance of said bridge at a submultiple of said first frequency, means coupled to said inductor for momentarily inducing oscillations therein, and an output winding magnetically coupled to said inductor for deriving energy at said submultiple frequency from said inductor.

3. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of opposed faces, a source of substantially sinusoidal signal at a first frequency, said signal source being coupled to said first pair of opposite plates of said bridge for supplying energy thereto, first and second tunable inductors coupled across said second and third pairs of plates, respectively, said inductors being tuned to resonate with the capacitance of said bridge at submultiples of said first frequency, and an output winding magnetically coupled to one of said inductors for deriving energy at said submultiple frequency from said last-mentioned inductor.

4. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of opposed faces, first and second signal sources, the signal supplied by each of said sources including at least a substantially sinusoidal component, the sinusoidal component of the signals from said first and second sources having a common subharmonic frequency, said first and second sources being coupled to said first and second pairs of plates, respectively, a tunable inductor coupled across said third pair of plates, said inductor being tuned to resonate with the capacitance of said bridge at said common submultiple frequency and an output winding magnetically coupled to said inductor for deriving energy at said submultiple frequency from said inductor, said energy at said submultiple frequency having a phase directly related to the phases of said two applied signals.

5. A frequency changing circuit comprising a block of ferroelectric material, first and second pairs of conductive electrodes disposed in contact with said block, the spacing between the electrodes of one pair being substantially the same as the spacing between the electrodes of the other pair, the disposition of said electrodes on said block being such that a line joining the two electrodes of one pair is substantially perpendicular to a line joining the electrodes of the other pair, a source of energy connected to said first pair of electrodes for supplying energy thereto, said energy having at least an oscillatory component, a tunable inductive impedance connected between said second pair of electrodes, the combination of said impedance and said second pair of electrodes being tuned to resonate at a predetermined frequency, said predetermined frequency bearing a simple integer relationship to the frequency of said oscillatory component of energy, and means associated with said inductive impedance for deriving an output signal therefrom.

6. A frequency changing circuit comprising a block of ferroelectric material, first, second and third pairs of conductive electrodes disposed in contact with said block, the spacing between the electrodes of any pair being substantially the same as the spacing between the two electrodes of the other two pairs, the disposition of said electrodes on said block being such that a line joining the two electrodes of any one of said pairs is substantially perpendicular to lines joining the electrodes in said other pairs, a source of energy connected to said first pair of electrodes for suppling energy thereto, said energy having at least an oscillatory component, a first inductive impedance connected across said second pair of electrodes, the combination of said impedance and said second pair of electrodes being resonant at a frequency which bears a simple integer relationship to the frequency of said oscillatory component of the signal supplied by said source, a second inductive impedance connected across said third pair of electrodes, the combination of said second impedance and said third pair of electrodes being resonant at a frequency which bears a simple integer relationship to the frequency of said oscillatory component of the signal supplied by said source and means associated with at least one of said impedances for deriving at least one output signal from said frequency changing circuit.

7. A frequency changing circuit comprising a block of ferroelectric material, first, second and third pairs of conductive electrodes disposed in contact with said block, the spacing between the electrodes of any pair being substantially the same as the spacing between the two electrodes of the other two pairs, the disposition of said electrodes on said block being such that a line joining the two electrodes of any one of said pairs is substantially perpendicular to lines joining the electrodes in said other pairs, a first source of energy connected to said first pair of electrodes for supplying energy thereto, a second source of energy connected to said second pair of electrodes for supplying energy thereto, the energy supplied by each of said sources having at least an oscillatory component, an inductive impedance connected across said third pair of electrodes, the combination of said impedance and said third pair of electrodes being resonant at a frequency which bears a simple integer relationship to the frequencies of the oscillatory components of the energy supplied by said first and second sources, and means associated with said inductive impedance for deriving an output signal therefrom.

8. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of faces, a first source of energy connected to said first pair of plates for supplying energy thereto, said energy having at least an oscillatory component, an inductive impedance connected across said second pair of plates, the combination of said impedance and said second pair of plates being resonant at a frequency bearing a simple integer relationship to the frequency of said oscillatory component of the signal supplied by said first source, and a second source of energy connected across said third pair of plates, said energy having at least an oscillatory component at a frequency bearing a simple integer relationship to the frequency of said oscillatory component supplied by said first source.

9. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of faces, a source of energy connected to said first pair of plates for supplying energy thereto, said energy having at least an oscillatory component, a first inductive impedance connected across said second pair of plates, the combination of said first impedance and said second pair of plates being resonant at a frequency bearing a simple integer relationship to the frequency of said oscillatory component of the signal supplied by said source, a second inductive impedance connected across said third pair of plates, the combination of said second impedance and said third pair of plates being resonant at a frequency bearing a simple integer relationship to the frequency of said oscillatory component of the signal supplied by said source.

10. A frequency changing circuit comprising a block of ferroelectric material, first, second and third pairs of conductive electrodes disposed in contact with said block, the spacing between the electrodes of any pair being substantially the same as the spacing between the two electrodes of the other two pairs, the disposition of said electrodes on said block being such that a line joining the two electrodes of any one of said pairs is substantially perpendicular to lines joining the electrodes in said other pairs, a first source of energy connected to said first pair of electrodes for supplying energy thereto, said energy having at least an oscillatory component, an inductive impedance connected across said second pair of electrodes, the combination of said impedance and said second pair of electrodes being resonant at a predetermined frequency bearing a simple integer relationship to the frequency of the oscillatory component supplied by said first source, a second source of energy connected to said third pair of electrodes, the energy supplied by said second source having at least an oscillatory component at a frequency bearing a simple integer relationship to the frequency of said oscillatory component supplied by said first source, and means for deriving at least one output signal from said frequency changing circuit.

11. A frequency changing circuit comprising a block of ferroelectric material, first, second and third pairs of conductive electrodes disposed in contact with said block, the spacing between the electrodes of any pair being substantially the same as the spacing between the two electrodes of the other two pairs, the disposition of said electrodes on said block being such that a line joining the two electrodes of any one of said pairs is substantially perpendicular to lines joining the electrodes in said other pairs, a source of energy connected to said first pair of electrodes for supplying energy thereto, said energy having at least an oscillatory component, a first inductive impedance connected across said second pair of electrodes, the combination of said first impedance and said second pair of electrodes being resonant at a predetermined frequency, a second inductive impedance connected across said third pair of electrodes, the combination of said second impedance and said third pair of electrodes being resonant at a predetermined frequency bearing a simple integer relationship to the frequency of the oscillatory component supplied by said source, and means for deriving at least one output signal from said frequency changing circuit.

12. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of faces, a first signal source, the signal supplied by said first source having at least a sinusoidal component, said first signal source being coupled to a first pair of opposite plates of said bridge for supplying energy thereto, a tunable inductor coupled across a second pair of opposite plates, said inductor being tuned to resonate with the capacitance of said bridge at a submultiple of the frequency of said sinusoidal component supplied by said first source, a second signal source connected across said third pair of plates for supplying energy thereto, the signal supplied by said second source having at least a sinusoidal component of a frequency bearing a simple integer relationship to the frequency of said sinusoidal component of the signal supplied by said first source, and a winding magnetically coupled to the inductor associated with said second pair of plates for deriving energy at said submultiple frequency therefrom.

13. A frequency divider circuit comprising a multiterminal capacitive bridge formed of a substantially cubical prism of ferroelectric material and first, second and third pairs of conductive plates, the two plates of each of said pairs being disposed on two opposed faces of said prism, each of said pairs of plates being disposed on a separate pair of faces, a signal source, the signal supplied by said source having at least a sinusoidal component, said signal source being coupled to a first pair of opposite plates of said bridge for supplying energy thereto, a first tunable inductor coupled across a second pair of opposite plates, said inductor being tuned to resonate with the capacitance of said bridge at a submultiple of the frequency of said sinusoidal component supplied by said source, a second tunable inductor coupled across said third pair of opposite plates, said second inductor being tuned to resonate with a capacitance of said bridge at a submultiple of the frequency of said sinusoidal component supplied by said source, and a winding magnetically coupled to the inductor associated with said second pair of plates for deriving energy therefrom.

14. A frequency multiplier comprising a source of alternating current of predetermined frequency to be multiplied, a block of ferroelectric material, means for applying said alternating current to opposing points on said ferroelectric material, and an electrical circuit including two other points on said ferroelectric material orthogonally disposed with respect to said first two points, said circuit being tuned to a predetermined multiple of said frequency to be multiplied to thereby produce in said circuit alternating current of a frequency which is a predetermined multiple of said predetermined frequency.

15. A device as recited in claim 14 in which said alternating current is applied to opposing surfaces of said ferroelectric material and in which said circuit includes opposing surfaces of said ferroelectric material arranged orthogonally with said first-named opposing surfaces.

References Cited in the file of this patent

UNITED STATES PATENTS

| | | |
|---|---|---|
| 1,569,132 | Osnos | Jan. 12, 1926 |
| 1,678,965 | Von Bronk | July 31, 1928 |
| 1,907,427 | Morrison | May 9, 1933 |
| 1,919,053 | Brinton | July 18, 1933 |
| 2,022,968 | May | Dec. 3, 1935 |
| 2,291,366 | Benz | July 28, 1942 |
| 2,387,472 | Sontheimer | Oct. 23, 1945 |
| 2,418,640 | Huge | Apr. 8, 1947 |
| 2,443,094 | Carlson | June 8, 1948 |
| 2,461,307 | Antalek | Feb. 8, 1949 |
| 2,470,893 | Hepp | May 24, 1949 |
| 2,625,663 | Howatt | Jan. 13, 1953 |